United States Patent
Shibata

(10) Patent No.: US 7,672,578 B2
(45) Date of Patent: Mar. 2, 2010

(54) IMAGE CAPTURING APPARATUS

(75) Inventor: Nobuhiro Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 11/671,056

(22) Filed: Feb. 5, 2007

(65) Prior Publication Data

US 2007/0196084 A1  Aug. 23, 2007

(30) Foreign Application Priority Data

Feb. 17, 2006  (JP) .............................. 2006-041201

(51) Int. Cl.
*G03B 17/00* (2006.01)
*H04N 5/228* (2006.01)
*H04N 5/76* (2006.01)

(52) U.S. Cl. .................. 396/55; 348/208.7; 348/208.11; 348/231.3

(58) Field of Classification Search .................. 396/55; 348/208.99, 208.2, 208.4, 208.5, 208.7, 208.11, 348/208.12, 240.99, 251, 231.3
See application file for complete search history.

(56) References Cited

U.S. PATENT DOCUMENTS

2002/0097324 A1* 7/2002 Onuki ........................ 348/208

2005/0024504 A1* 2/2005 Hoshi ........................ 348/231.3

FOREIGN PATENT DOCUMENTS

| EP | 0942309 A2 | 9/1999 |
|---|---|---|
| JP | 2004-040298 | 2/2004 |
| WO | WO 2005-045516 A1 | 5/2005 |

* cited by examiner

*Primary Examiner*—W. B. Perkey
*Assistant Examiner*—Minh Q Phan
(74) *Attorney, Agent, or Firm*—Cowan, Liebowitz & Latman, P.C.

(57) ABSTRACT

An image capturing apparatus includes a calculation unit which converts shaking detected by a sensor unit into a shaking cancel amount, a correction/driving unit which drives a correction unit using the shaking cancel amount in a plane perpendicular to the optical axis, and corrects blurring of an image formed on an image capturing unit, a zoom position detection unit which detects the current zoom position of a zoom lens, and a center point change unit which changes a center point serving as a movable center of the correction unit in accordance with the zoom position set at either end of the zoom range, or an arbitrary position therebetween. This enables a position of a correction unit to be set which allows optimal image visibility and image blurring correction irrespective of the zoom state.

8 Claims, 8 Drawing Sheets

(LUMINANCE CENTER POINT CALCULATION PROCEDURE)

(MECHANICAL CENTER POINT CALCULATION PROCEDURE)

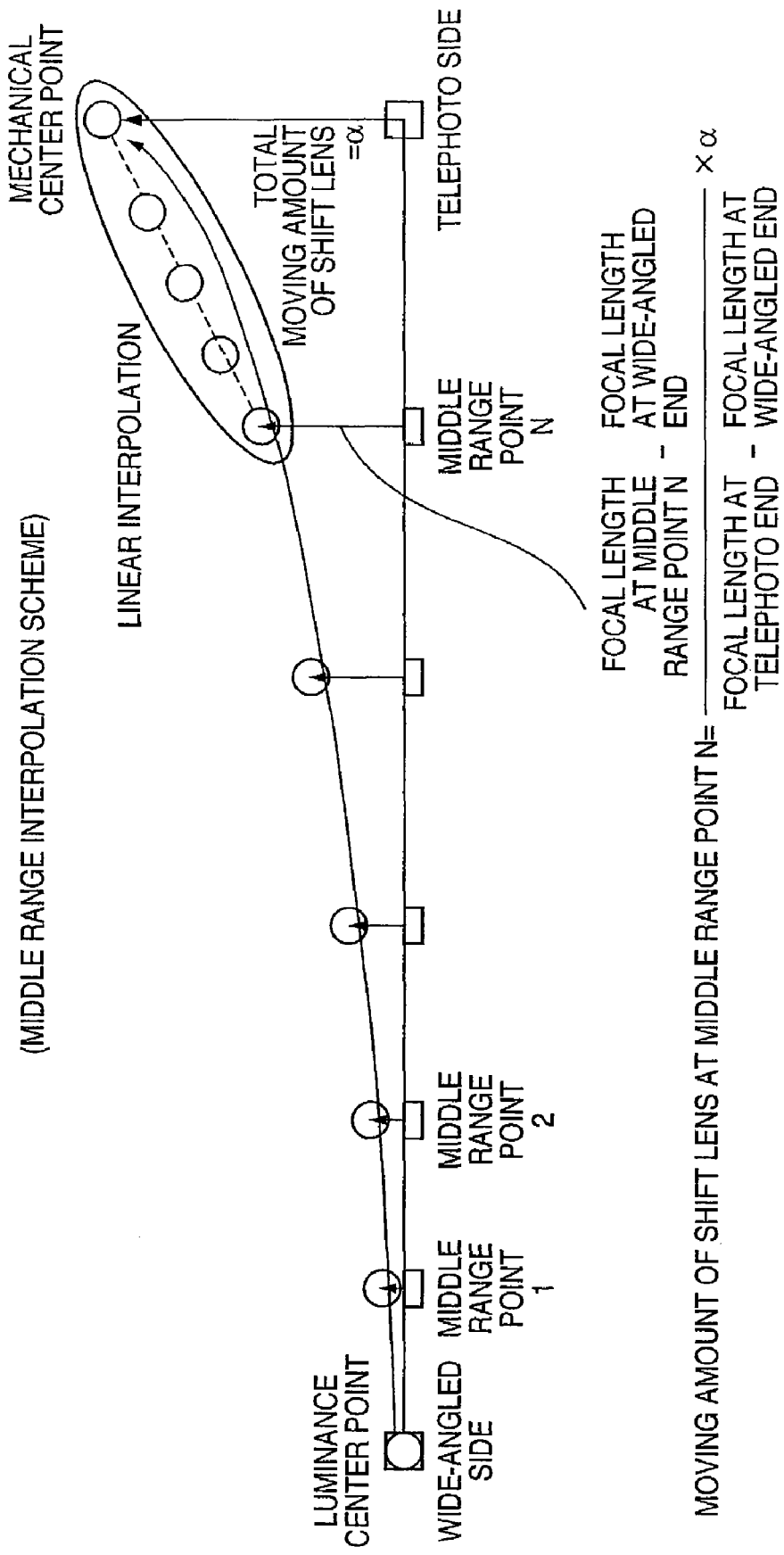

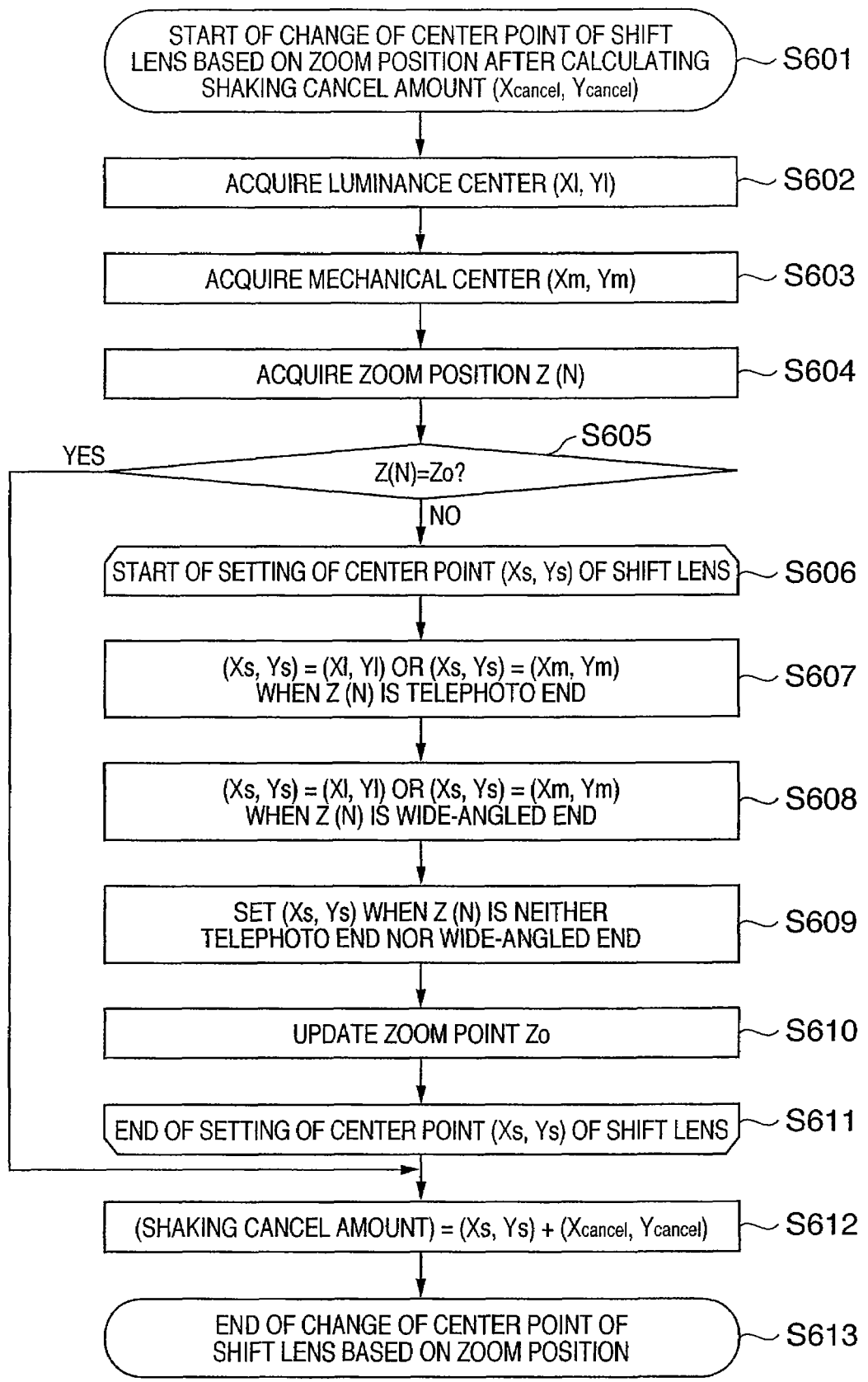

IMAGE CAPTURING APPARATUS

BACKGROUND OF THE INVENTION

1. Field of the Invention

The present invention relates to an improvement in an image capturing apparatus having an image blurring correction function and zoom position change function.

2. Description of the Related Art

Generally, an image capturing apparatus obtains image data with a periphery including the four corners which is darker than the center of an image. Especially, a phenomenon in which the light amount at the periphery becomes lower than that of the center is called shading. As the rate of decrease in light amount from the center to the periphery increases, or as the four corners form more asymmetric shading, i.e., a variation in their luminances increases, the quality of image data degrades. A lens exhibits a unique degree of decrease in light amount. This property causes a variation in luminance. The degree of decrease in light amount changes also depending on the focal length, i.e., zoom position if the lens is a zoom lens.

For example, the wide-angled side may exhibit a highest rate of decrease in the light amount at the lens periphery, and the telephoto side may exhibit a very low rate of decrease (see FIG. 3A). A noticeably high rate of decrease in the light amount at the periphery can be caused by a mechanical error or play of a lens barrel which houses lenses, resulting in an increase in variation in the luminances at the four corners (see FIG. 3B).

An apparatus using the arrangement of an image blurring correction function is available as a technique for reducing a variation in the luminances at the four corners of an image (see Japanese Patent Laid-Open No. 2004-40298).

Along with the recent increase in magnification and miniaturization of image capturing apparatuses, a demand has arisen for installing a function of correcting image blurring due to a camera shake of an image capturing apparatus. In fact, the number of image capturing apparatuses with this function is increasing. The image blurring correction mechanism includes a sensor means for mainly detecting shaking such as a camera shake of an image capturing apparatus, a calculation means for converting the resultant shaking amount into a shaking cancel amount, and a correction means such as a correction lens (to be referred to as a shift lens hereinafter) for eliminating image blurring. A shift lens operates in a plane perpendicular to the image sensing optical axis to eliminate blurring of an image formed on an image sensor.

By adjusting the center point of a shift lens at a zoom position having a highest rate of decrease in the light amount at the periphery, a variation in the luminances at the four corners can fall within a predetermined level in the entire zoom area. The adjusted center point may be different from the center of the mechanical driving range of the shift lens.

Assume that a lens to be used has a wide-angled side with a highest rate of decrease in the light amount at the lens periphery and has a telephoto side with a very low rate of decrease, and a position at which a variation in the luminances at the four corners on the wide-angled side is adjusted serves as a center point fixed in the entire zoom area. As the shift between a center point at which a variation in the luminances at the four corners is adjusted and the center point of the mechanical driving range increases, a change in angle of view increases at the time of zoom driving to the telephoto side because the center of the angle of view must originally be the center point of the mechanical driving range. Especially, the zoom position on the telephoto side suffers a noticeably large change in angle of view. This results in image data with an angle of view which is not intended by a photographer (with an error of the angle of view at the time of zoom driving), depending on the zoom position. Furthermore, the visibility of a live image at the time of zoom driving suffers.

A wider dynamic range of the driving of a shift lens is advantageous to image blurring correction. This is because a wider driving range of a shift lens decreases the property change amount in control when a camera shake and abrupt large shaking are detected simultaneously. This allows high-speed, precise image blurring correction. A wider original driving dynamic range is also advantageous to assure a control range sufficient to decrease a variation in center point of a shift lens due to temperature change. For this reason, image blurring correction becomes optimal when the center point of a shift lens serves as the center of the mechanical driving range. However, optimal image blurring correction control sometimes fails when the center point of a shift lens serves as the luminance center in the entire zoom area.

SUMMARY OF THE INVENTION

It is an object of the present invention to provide an image capturing apparatus capable of setting a center point of a correction unit, which allows optimal image visibility and image blurring correction irrespective of the zoom state.

In order to achieve the above object, according to a first aspect of the present invention, there is provided an image capturing apparatus which includes sensor unit configured to detect shaking, calculation unit configured to convert the shaking detected by the sensor unit into a shaking cancel amount, correction/driving unit configured to drive correction unit using the shaking cancel amount in a plane perpendicular to an optical axis, and to correct blurring of an image formed on image capturing unit, and zoom position detection unit configured to detect a current zoom position of a zoom lens, comprising center point change unit configured to change a center point serving as a movable center of the correction unit in accordance with a zoom position set at either end of the zoom range, or at an arbitrary position therebetween.

According to a second aspect of the present invention, there is provided an image capturing apparatus from which a lens is detachable and which includes sensor unit configured to detect shaking, correction/driving unit configured to drive correction unit in a plane perpendicular to an optical axis in accordance with the shaking detected by the sensor unit, and correcting blurring of an image formed on image capturing unit, and zoom position detection unit configured to detect a current zoom position of a zoom lens, comprising change designation unit configured to change a center point serving as a movable center of the correction unit in accordance with a zoom position set at either end of the zoom range, or at an arbitrary position therebetween.

Further features of the present invention will become apparent from the following description of exemplary embodiments (with reference to the attached drawings).

BRIEF DESCRIPTION OF THE DRAWINGS

FIG. 5 is a graph showing the driving of a shift lens at the time of zoom driving according to the embodiment of the present invention;

FIG. 6 is a flowchart showing an operation for changing the center of the shift lens in accordance with the zoom position according to the embodiment of the present invention;

DESCRIPTION OF THE EMBODIMENT

The best mode for carrying out the present invention will be described below.

Figure 1:
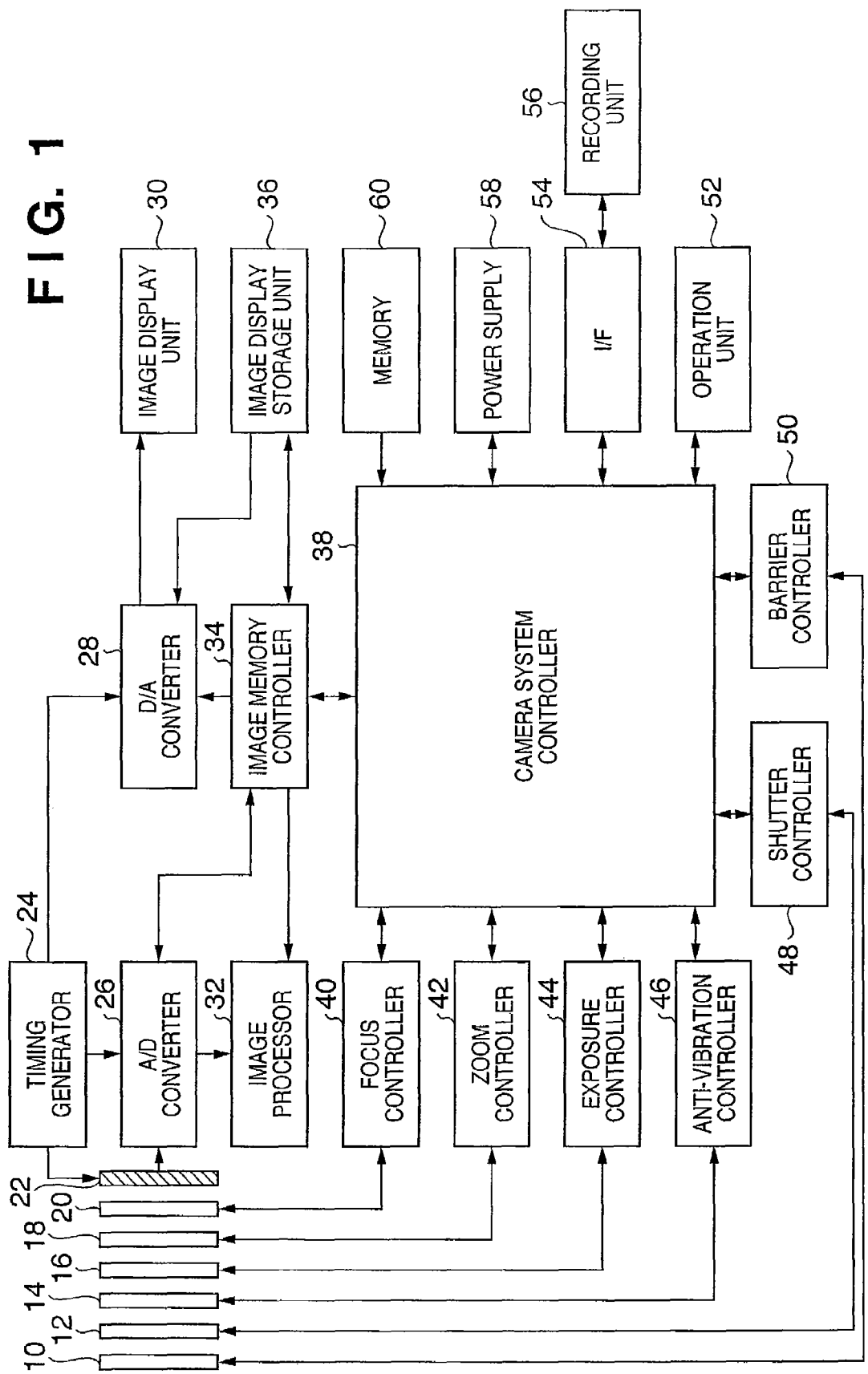
FIG. 1 is a block diagram showing the circuit arrangement of an image capturing apparatus according to an embodiment of the present invention.

FIG. 1 is a block diagram showing the circuit arrangement of an image capturing apparatus according to an embodiment of the present invention. Referring to FIG. 1, reference numeral 10 denotes a barrier serving as a photographing lens protection means; 50, a barrier controller for controlling the operation of the barrier 10; 12, a shutter; 48, a shutter controller for controlling the opening/closing of the shutter 12; 14, a shift lens for eliminating image blurring from an image formed on the image sensor 22 (to be described later); 46, an anti-vibration controller for controlling the driving of the shift lens 14; 16, an aperture stop; 44, an exposure controller for controlling the stop 16; 18, zoom lens; 42, a zoom controller for controlling the zoom lens 18 to change the zoom magnification; 20, a focus lens; 40, a focus controller for controlling the focus lens 20 to perform focusing; and 22; an image sensor for converting an optical image into an electrical signal.

A timing generator 24 supplies a clock signal to the image sensor 22, a D/A converter 28, and an A/D converter 26. An image memory controller 34 controls the A/D converter 26, the D/A converter 28, an image processor 32, and an image display storage unit 36. The image processor 32 executes a predetermined pixel interpolation process or color conversion process for data from the A/D converter 26 or data from the image memory controller 34.

Data from the A/D converter 26 is written in the image display storage unit 36 via the image processor 32 and image memory controller 34 or directly via the image memory controller 34. An image display unit 30 displays, via the D/A converter 28, the display image data written in the image display storage unit 36. Sequentially displaying captured image data using the image display unit 30 makes it possible to implement an electronic viewfinder function.

A camera system controller 38 controls the focus controller 40, zoom controller 42, exposure controller 44, shutter controller 48, and barrier controller 50. A memory 60 has a storage capacity sufficient to store a predetermined number of still images or moving images in a predetermined period of time. The memory 60 can also be used as a working area of the camera system controller 38. The power supply 58 comprises a battery detection circuit and DC-DC converter to switch a block to be electrically connected. More specifically, the power supply 58 includes switch circuits to detect the presence/absence of a battery, the type of battery, and the remaining battery level. On the basis of the detection results and instructions from the camera system controller 38, the power supply 58 controls the DC-DC converter to apply a necessary voltage to units including a recording medium for a predetermined period of time.

An interface (I/F) 54 serves as an interface with recording media such as a memory card and hard disk. A recording unit 56 accesses the camera system controller 38 via the interface 54. An operation unit 52 comprises a touch panel and various kinds of buttons such as an exposure compensation button, zoom button, menu button, menu move button, macro button, playback image move button, flash setting button, single shot/continuous shot/self-timer switching button, multiwindow playback page break button, and captured image quality select button.

Figure 2:
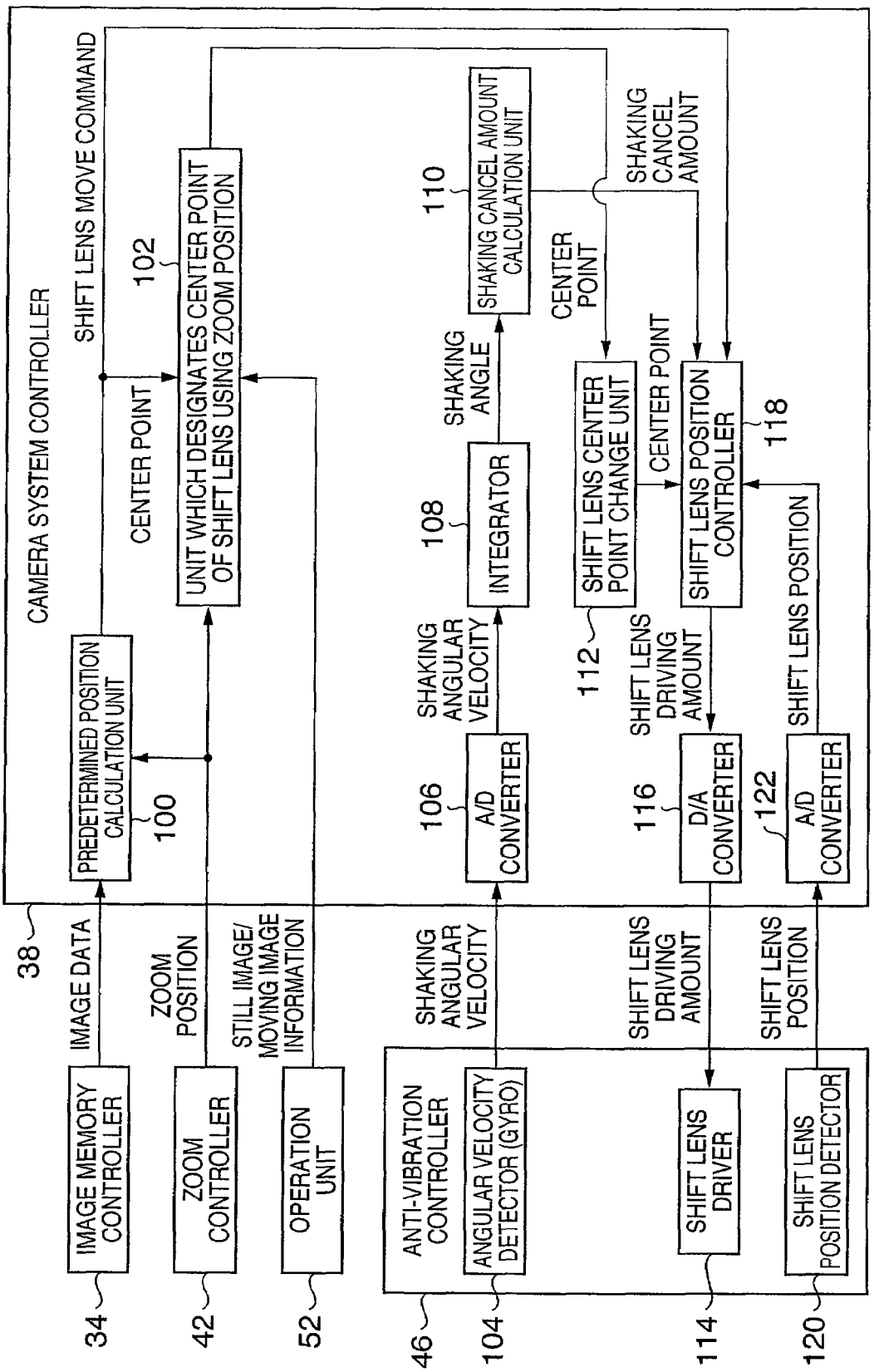
FIG. 2 is a block diagram showing the circuit arrangement of the main part of the image capturing apparatus shown in FIG. 1.

FIG. 2 is a block diagram for explaining, e.g., the relationship between the anti-vibration controller 46 and the camera system controller 38 in more detail. Referring to FIG. 2, an angular velocity detector (to be referred to as a gyro hereinafter) 104 detects angular velocity data and outputs it as a voltage. An A/D converter 106 for angular velocity detection converts the data output from the gyro 104 into digital data. An integrator 108 integrates the angular velocity data to convert it into angular data. A shaking cancel amount calculation unit 110 sets, as shaking cancel data, a direction opposite to the shaking angular data, and changes the property of the shift lens 14 in accordance with its driving range. A shift lens position controller 118 receives the data output from the shaking cancel amount calculation unit 110.

Figure 3A:
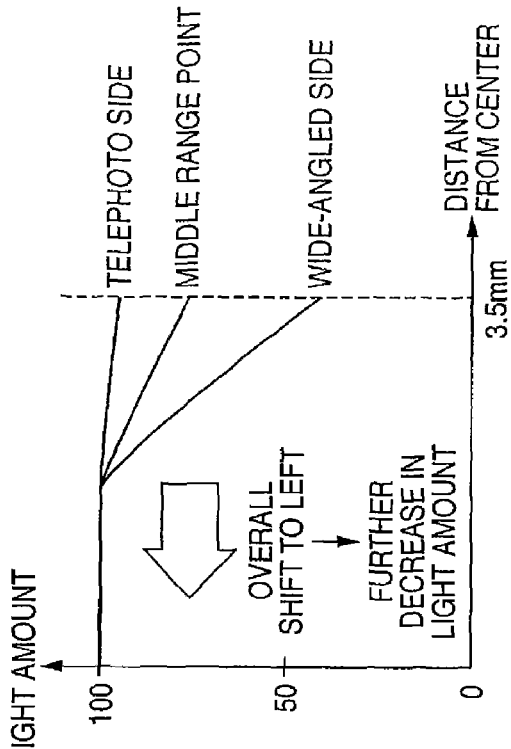
FIGS. 3A and 3B are graphs each showing a decrease in light amount at the periphery according to the embodiment of the present invention.
Figure 3B:
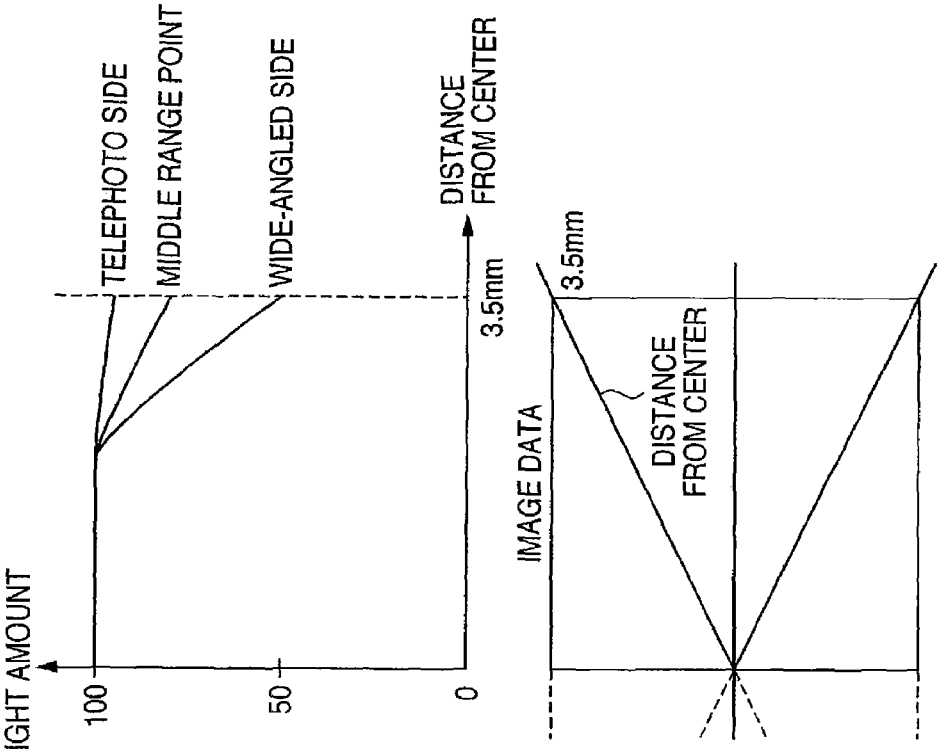

The upper view of FIG. 3A and FIG. 3B are graphs each for explaining the light amount of the lens as a function of the distance from its center. The abscissa represents the distance from the center of the lens (unit: mm). The ordinate represents the light amount, i.e., the ratio of the light amount at the peripheral position when the light amount at the center point is defined as "100". The lower view of FIG. 3A is a graph two-dimensionally expressing the distance from the center point to the peripheral position of image data in association with the upper view of FIG. 3A. The abscissa and ordinate each represent the distance (unit: mm).

Referring back to FIG. 2, a shift lens center point change unit 112 outputs a change of the center point in accordance with the zoom position to the shift lens position controller 118. A shift lens position detector 120 detects the position of the shift lens 14 and outputs it as a voltage. An A/D converter 122 converts the data output from the shift lens position detector 120 into digital data.

The shift lens position controller 118 performs feedback control so that the difference between the shaking cancel amount and the position data detected by the shift lens position detector 120 becomes close to "0". A D/A converter 116 for a shift lens finally converts a signal to drive the shift lens 14 into analog data, and outputs it to a shift lens driver 114. Upon receiving the driving signal, the shift lens driver 114 drives the shift lens 14 by a corresponding amount.

A predetermined position calculation unit 100 obtains a predetermined position either in advance, or by calculating it as a center point (luminance center) when the light amount at the lens periphery is made uniform within a predetermined range or by calculating it as a center point (mechanical center) when the lens driving limit range is equally divided by a predetermined error range.

Figure 4A:
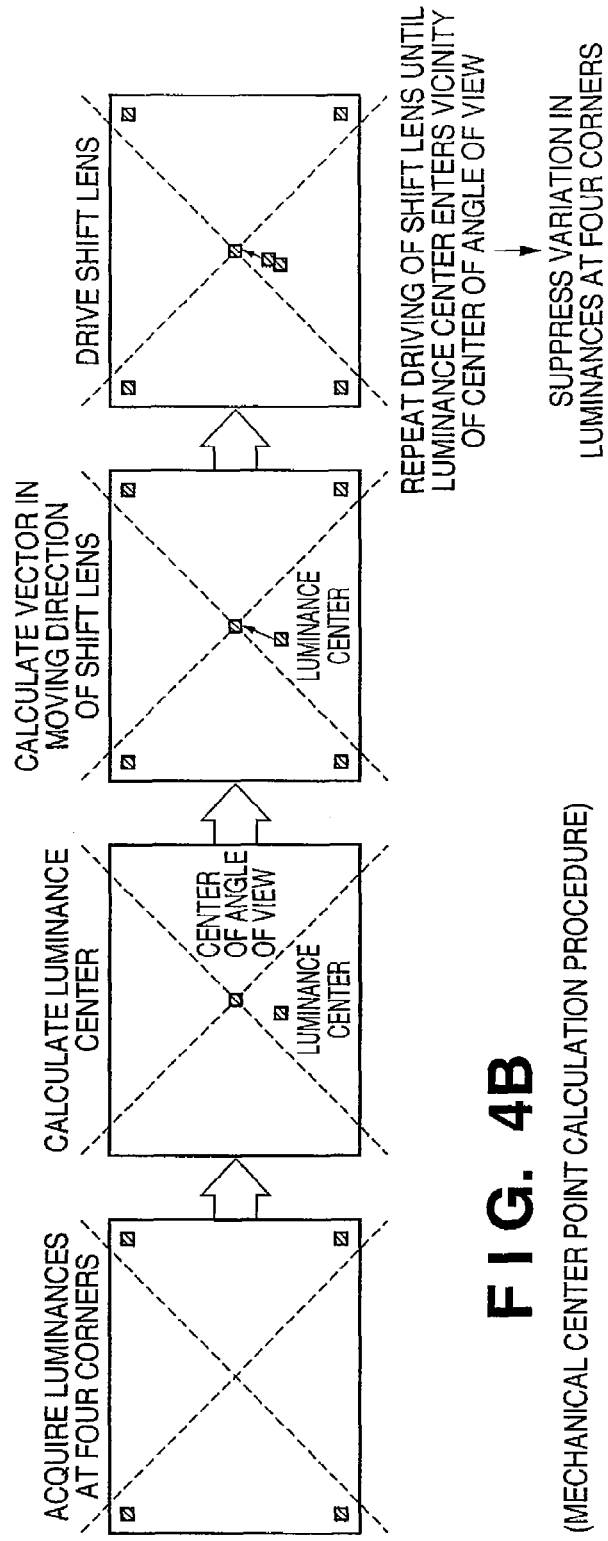
FIGS. 4A and 4B are views showing luminance center and mechanical center calculation methods according to the embodiment of the present invention.

Luminance center calculation will now be described. The predetermined position calculation unit 100 acquires the luminance at the periphery of image data from the image memory controller 34 shown in FIG. 1. When the four corners have a variation in luminance, the predetermined position calculation unit 100 outputs, to the shift lens position controller 118, a shift lens move command to drive the shift lens 14 in a variation correction direction. The predetermined position calculation unit 100 repeats this process until the variation in the luminances at the periphery converges into a predetermined range. The calculated center point (which indicates a movable center point) of the shift lens 14 then serves as the luminance center (see FIG. 4A).

Figure 4B:
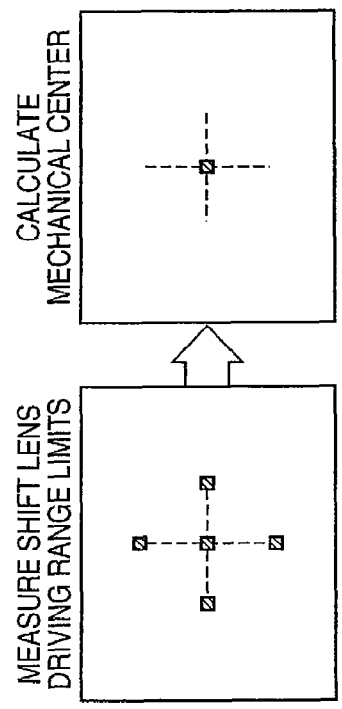

Mechanical center calculation will now be described. The predetermined position calculation unit 100 outputs, to the shift lens position controller 118, a shift lens move command to drive the shift lens 14 to the limits in the horizontal and vertical directions on the mechanical driving range plane. The middle point between the limit points in the driving range serves as the mechanical center. The calculated center point of the shift lens 14 serves as the mechanical center (see FIG. 4B).

A unit 102 which designates the center point of a shift lens using the zoom position, outputs—in accordance with the zoom position—a predetermined position (center point) (obtained by the predetermined position calculation unit 100) to the shift lens center point change unit 112. The unit 102, which designates the center point of a shift lens using the zoom position, also serves to calculate the center point of the shift lens 14 in the middle range between of the wide-angled end and the telephoto end. Assume, for example, that two zoom positions are the wide-angled end and the telephoto end, and the wide-angled end has a higher rate of decrease in the light amount at the periphery than the telephoto end. In this case, the center point of the shift lens 14 serves as the luminance center of the wide-angled end and as the mechanical center of the telephoto end. In the middle range between the wide-angled end and the telephoto end, linear interpolation, focal length interpolation, or a combination thereof between these two points is done. Assume, similarly, that the telephoto end has a higher rate of decrease in the light amount at the periphery than the wide-angled end. In this case, the center point of the shift lens 14 serves as the luminance center of the telephoto end and as the mechanical center of the wide-angled end. In the middle range, linear interpolation, focal length interpolation, or a combination thereof between these two points is done.

The scheme for combining linear interpolation and focal length interpolation indicates a scheme for performing linear interpolation in the middle range and performing focal length interpolation in a predetermined middle subrange, or a scheme for performing focal length interpolation in the middle range and performing linear interpolation in a predetermined middle subrange. For example, focal length interpolation is done in a middle subrange, in which the shift lens 14 moves a small amount, and linear interpolation is done for in a middle subrange, in which the shift lens 14 moves a large amount (see FIG. 5).

FIG. 5 is a graph for two-dimensionally explaining the moving amount of the shift lens 14 for correction as a function of the zoom position. The abscissa represents the zoom position corresponding to each of predetermined subdivision points between the wide-angled side and telephoto end determined in advance. The ordinate represents the moving amount of the shift lens 14 for correction. This makes it possible to increase the visibility of a live image while minimizing a deviation of the angle of view in accordance with the zoom position. The operation unit 52 acquires the current mode information of the image capturing apparatus. This allows switching to a scheme for performing linear interpolation in a still image mode and combining focal length interpolation and linear interpolation in a moving image mode. In a moving image mode in which the zoom speed decreases, the recording unit 56 can keep more live images than in a still image mode. For this reason and others, a scheme which attaches a great importance to the visibility in a moving image mode, in particular, is also applicable.

A change of the center point of the shift lens 14 at an arbitrarily set zoom position between the telephoto end and the wide-angled end will be explained with reference to the flowchart shown in FIG. 6.

The shaking cancel amount calculation unit 110 calculates a shaking cancel amount ($X_{cancel}$, $Y_{cancel}$) in advance. The predetermined position calculation unit 100 calculates a first predetermined position (Xl, Yl) and second predetermined position (Xm, Ym) in advance in accordance with the zoom position. Also in the following description, two zoom positions are the wide-angled end and telephoto end, and each of the first and second predetermined positions is the luminance center or mechanical center.

In step S601 of FIG. 6, a process for changing the center point of the shift lens in accordance with the zoom position starts. This change process is part of processes sampled in a predetermined period of time. In step S602, the predetermined position calculation unit 100 acquires a luminance center (Xl, Yl) in accordance with a predetermined zoom position. In step S603, the predetermined position calculation unit 100 acquires a mechanical center (Xm, Ym) in accordance with a predetermined zoom position. In step S604, the zoom controller 42 acquires a zoom position Z (N) (N is a middle range point) in the current sampling.

It is determined in step S605 whether the zoom position Z (N) in the current sampling has changed as compared with a zoom position Zo in the previous sampling. If the result reveals that the zoom position has changed, the process advances to step S606 to start the setting of a shift lens center point (Xs, Ys). If the result reveals that the zoom position has not changed, the setting of the shift lens center point (Xs, Ys) does not start.

The following description applies to a case in which the zoom position has changed. Assume that the wide-angled side has a highest rate of decrease in the light amount at the lens periphery. In step S607, when the zoom position is the telephoto end, the shift lens center point (Xs, Ys) is set as the mechanical center (Xm, Ym). In step S608, when the zoom position is the wide-angled end, the shift lens center point (Xs, Ys) is set as the luminance center (Xl, Yl). In step S609, when the zoom position is a middle range point, the shift lens center point (Xs, Ys) is set (for example by interpolation, as described later).

To the contrary, assume that the telephoto end has a highest rate of decrease in the light amount at the lens periphery due to its property. In step S607, when the zoom position is the telephoto end, the shift lens center point (Xs, Ys) is set as the luminance center (Xl, Yl). In step S608, when the zoom position is the wide-angled end, the shift lens center point (Xs, Ys) is set as the mechanical center (Xm, Ym). In step S609, when the zoom position is a middle range point, the shift lens center point (Xs, Ys) is set (for example by interpolation as described, later).

In step S610, the zoom position Zo in the previous sampling is updated to the zoom position Z (N) in the current sampling. In step S611, the setting of the shift lens center point (Xs, Ys) ends. The procedure up to here is the process by the unit 102 which designates the center point of a shift lens using the zoom position. In step S612, the shift lens center point (Xs, Ys) is added to the shaking cancel amount ($X_{cancel}$, $Y_{cancel}$) to calculate a final shaking cancel amount.

Figure 7:
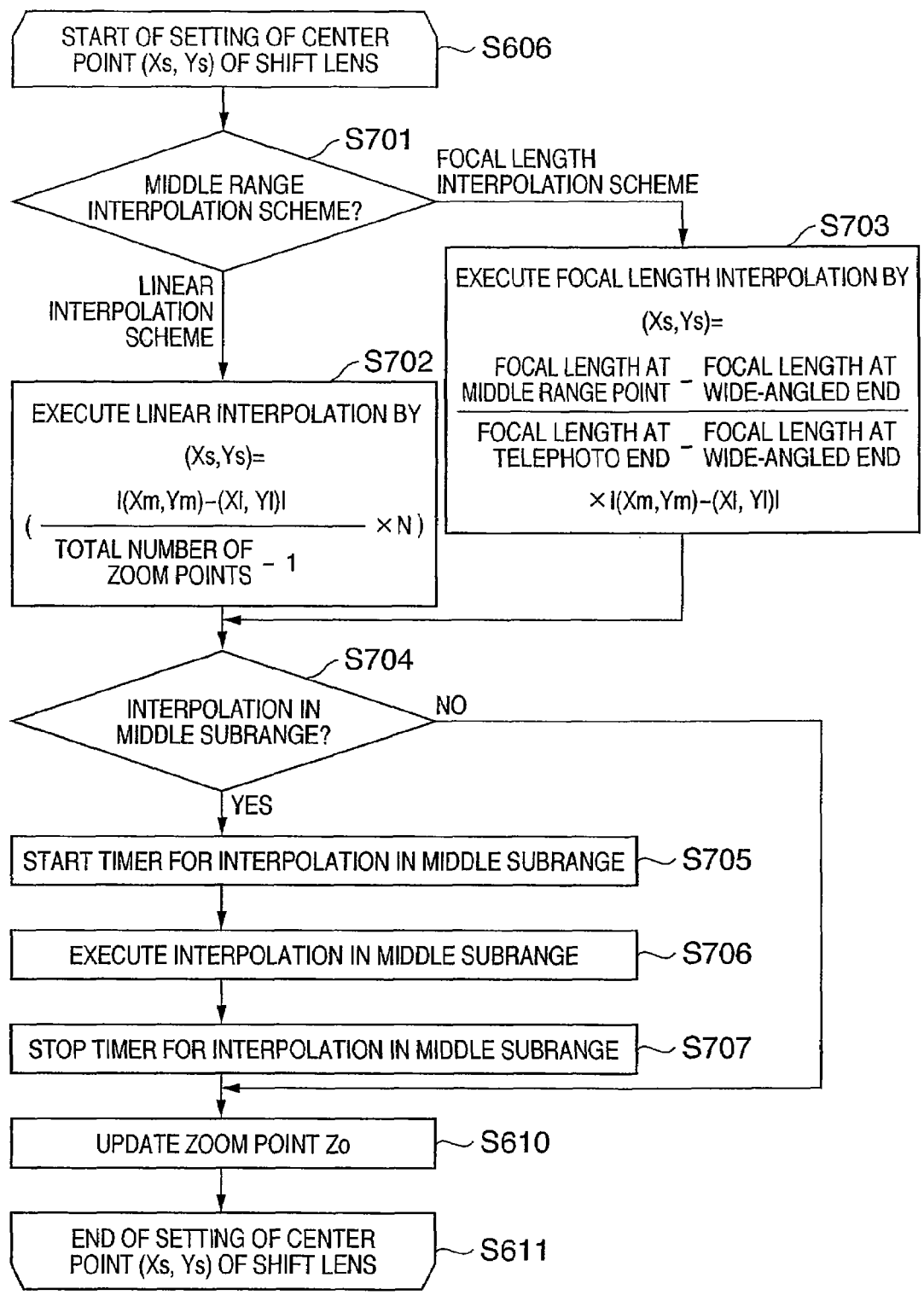
FIG. 7 is a flowchart showing an operation when the zoom position is in the middle range between the wide-angled end and the telephoto end in step S609 of FIG. 6.

FIG. 7 is a flowchart showing an operation for changing the center point of the shift lens 14 by a predetermined interpolation scheme when the zoom position is a middle range point in step S609 of FIG. 6.

In step S701, an interpolation scheme when the zoom position Z (N) is a middle range point is determined. If the interpolation scheme is linear interpolation, the process advances to step S702 to set, as the moving amount of the center point in the middle range, a multiplication result of the current zoom point N and an amount obtained by equally dividing a total moving amount |(Xm, Ym)−(Xl, Yl)| of the center point in the entire zoom area by "the zoom point −1". If the interpolation scheme is focal length interpolation, the process advances to step S703 to set, as the moving amount of the middle range point as a function of a total moving amount |(Xm, Ym)−(Xl, Yl)| in the entire zoom area, the ratio of "(the current focal length)−(the focal length at the wide-angled end)" to the focal length from the telephoto end to the wide-angled end.

It is determined in step S704 whether to execute interpolation in a middle subrange. If the result reveals that interpolation in middle subrange is to be done, the process advances to step S705 to set a timer to count a time sufficiently shorter than in the current control sampling. In step S706, interpolation in a middle subrange is done. This interpolation method uses the same equation as that in step S702 for linear interpolation, and uses the same equation as that in step S703 for focal length interpolation. After completing interpolation in the middle subrange, the timer stops in step S707.

Figure 8:
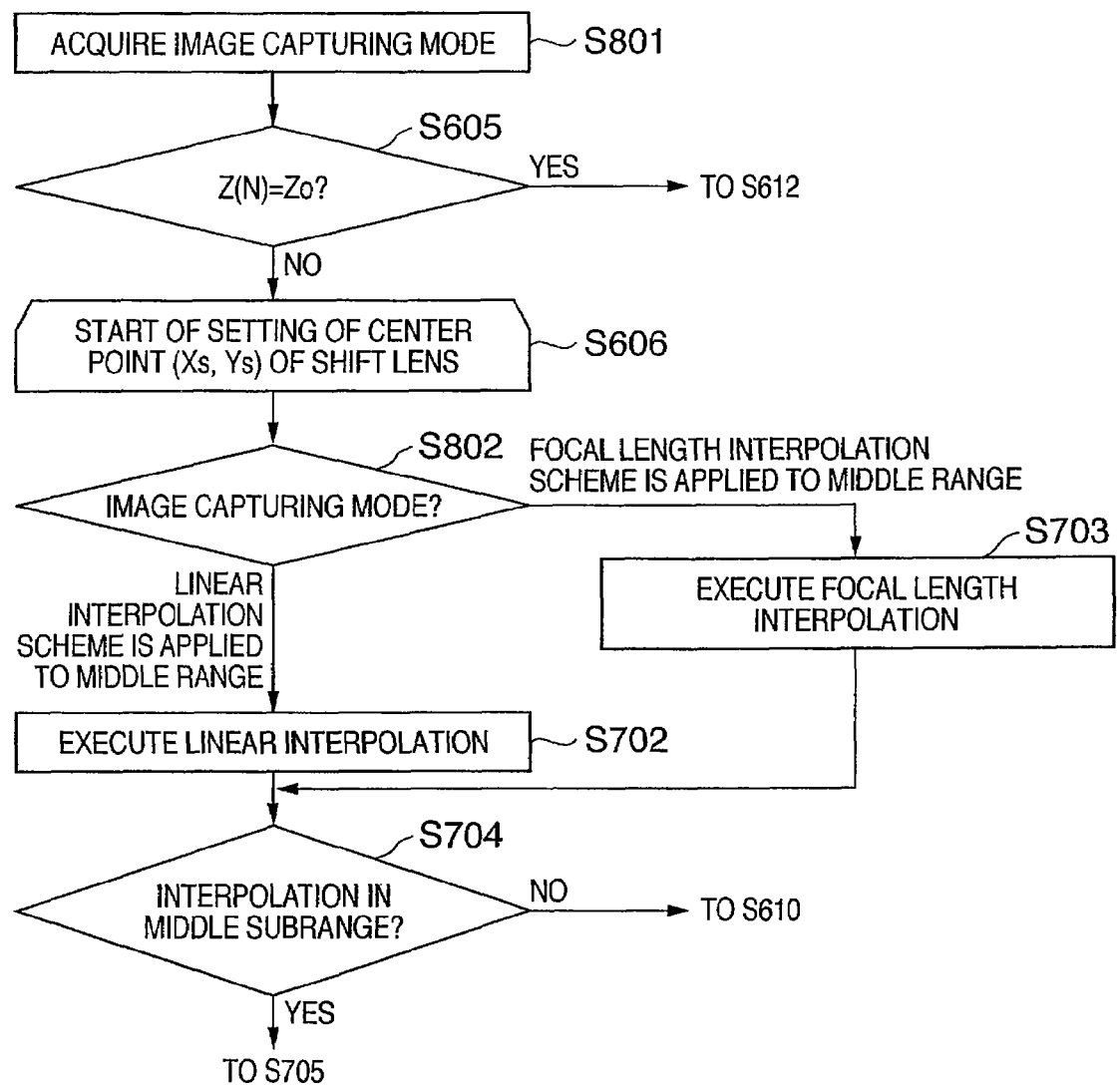
FIG. 8 is a flowchart showing an operation for switching an interpolation scheme in the middle range between the wide-angled end and the telephoto end between a still image mode and moving image mode in FIGS. 6 and 7.

FIG. 8 is a flowchart showing an operation for switching an interpolation scheme in a middle range between a still image mode and moving image mode in FIGS. 6 and 7.

In step S801, the current image capturing mode is acquired from the operation unit 52. If the zoom position has changed in steps S605 and S606, an interpolation scheme in this image capturing mode is determined in step S802. Assume, for example, that a linear interpolation scheme (which uses the same equation as that in step S702) is adopted in a still image mode. In this case, it is determined in step S704 that no interpolation in middle subrange is to be done. To the contrary, assume that a focal length interpolation scheme (which uses the same equation as that in step S703) is adopted in a moving image mode. In this case, it is determined in step S704 that linear interpolation in a middle subrange is to be done. Similarly, it is possible to adopt the focal length interpolation scheme in a still image mode and linear interpolation scheme in a moving image mode. To execute interpolation in a middle subrange, it is also possible to select the focal length interpolation scheme and linear interpolation scheme and combine operations corresponding to these schemes in accordance with the lens property.

According to the above-described embodiment, at a zoom position (e.g., the wide-angled position) having a highest rate of decrease in the light amount at the periphery of the shift lens 14, its center point is set to the luminance center (=a center point when the light amount at the lens periphery is made uniform within a predetermined range). This makes it possible to reduce the rate of decrease in the light amount at the periphery. At a zoom position (e.g., the telephoto position) having a lowest rate of decrease in the light amount at the periphery of the shift lens 14, its center point is set to the mechanical center (=a center point when the lens driving limit range is equally divided with a predetermined error range). This makes it possible to assure the full stroke of the shift lens 14 for a reduction in zoom deviation and image blurring correction control. At a middle range point, a predetermined interpolation scheme changes the center point of the shift lens 14. Correcting a deviation of the angle of view at the time of zoom driving in this manner makes it possible to acquire image data intended by a photographer, thus improving the visibility at the time of zoom driving. An appropriate zoom position allows assurance of a driving range of the shift lens 14, which is sufficient for optimal image blurring correction.

In place of the correction lens in the above-described embodiment, the correction means may be an image sensor which moves in a plane perpendicular to the optical axis to correct image blurring.

The present invention is also applicable to an image capturing apparatus, e.g., a digital single-lens reflex camera, from which a lens is detachable. In this case, all the constituent components of the present invention may be attached to the lens, or the change instruction means 100, 102, or 112 may be attached to the main body of the image capturing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-041201, filed Feb. 17, 2006, which is hereby incorporated by reference herein in its entirety.

What is claimed is:

1. An image capturing apparatus having a still image capturing mode and a moving image mode comprising:
    a sensor unit configured to detect shaking;
    a calculation unit configured to convert the shaking detected by the sensor unit into a shaking cancel amount;
    a correction/driving unit configured to drive a correction unit using the shaking cancel amount in a plane perpendicular to an optical axis, and to correct blurring of an image formed on an image capturing unit;
    a zoom position detection unit configured to detect a current zoom position of a zoom lens;
    a center point setting unit configured to set a center point serving as a movable center of the correction unit at a first center point, at either end of the zoom range, set the center point at a second center point located at a center of a driving limit range at the other end of the zoom range, and set the center point at a third center pint calculated by interpolation between the first center point and the second center point at an arbitrary set zoom position,
    wherein the third center point is calculated with a finer pitch in the moving image capturing mode than in the still image capturing mode.

2. The apparatus according to claim 1, wherein the third center point is calculated by the linear interpolation between two points in the still image capturing mode and the third point is calculated by a combination of the focal length interpolation between two points and the linear interpolation in the moving image capturing mode.

3. The apparatus according to claim 1, wherein one end of the zoom range is a wide-angled end and the other is a telephoto end.

4. The apparatus according to claim 1, wherein in the moving image capturing mode, the third center point is calculated by a focal length interpolation and succeeding linear interpolation for two points which are set by the focal length interpolation.

5. The apparatus according to claim 4, wherein the linear interpolation is performed when the zoom position is set to a wider-angled side than a predetermined zoom position.

6. An image capturing apparatus from which a lens is detachable and having a still image capturing mode and a moving image capturing mode comprising:
- a sensor unit configured to detect shaking;
- a correction/driving unit configured to a drive correction unit in a direction perpendicular to an optical axis in accordance with the shaking detected by the sensor unit, and correcting blurring of an image formed on an image capturing unit;
- a zoom position detection unit configured to detect a current zoom position of a zoom lens;
- a center point setting unit configured to set a center point serving as a movable center of the correction unit at a first center point, at either end of the zoom range, set the center point at a second center point located at a center of a driving limit range at the other end of the zoom range, and set the center point at a third center point calculated by interpolation between the first center point and the second center point at an arbitrarily set zoom position,
  wherein the third center point is calculated with a finer pitch in the moving image capturing mode than in still image capturing mode.

7. The apparatus according to claim 6, wherein in the moving image capturing mode, the third center point is calculated by a focal length interpolation and succeeding linear interpolation for two points which are set by the focal length interpolation.

8. The apparatus according to claim 7, wherein the linear interpolation is performed when the zoom position is set to a wider-angled side than a predetermined zoom position.

* * * * *